United States Patent Office 2,781,511
Patented Feb. 12, 1957

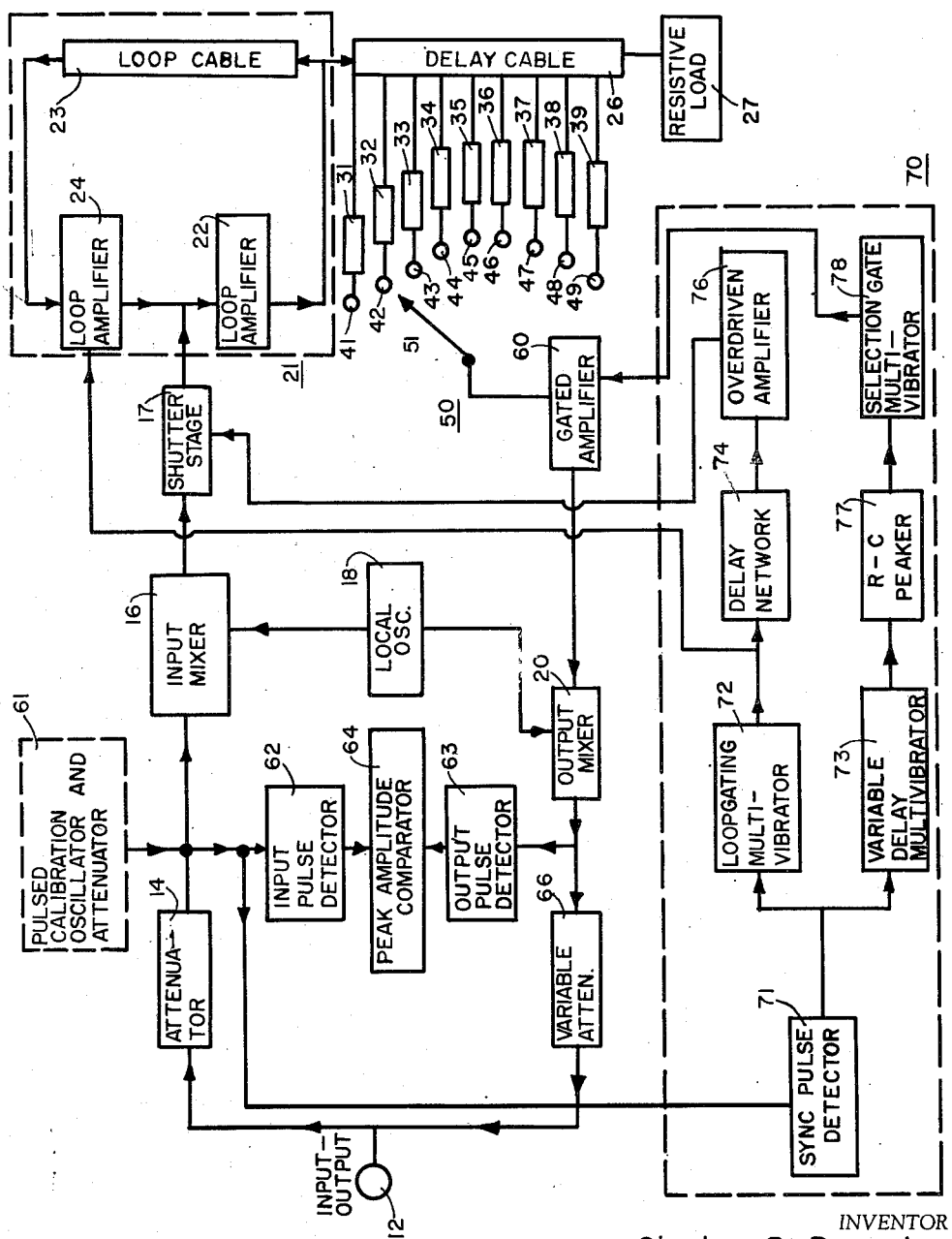

2,781,511

ECHO SIMULATOR

Charles B. Pear, Jr., College Park, Md., assignor to the United States of America as represented by the Secretary of the Army Application January 13, 1955, Serial No. 481,725

1 Claim. (Cl. 343—17.7)

This invention relates to pulsed radar systems. It is a principal object of the invention to provide an echo simulator for connection to the antenna terminal of a pulsed radar set. So connected, the simulator returns to the radar set simulated echo pulses of the same frequency and shape as the transmitted pulses but with known and adjustable delay time and known and adjustable attenuation.

Other objects, aspects, uses, and advantages of the invention will become apparent from the following description and from the accompanying drawing.

The figure is a block diagram of a preferred form of radar echo simulator in accordance with the invention.

Referring to the figure, an input-output terminal 12 is adapted to be connected to the antenna terminal of a pulsed radar set designed for a single antenna. It will be understood from what follows, however, that the invention is readily adaptable to pulsed radar sets designed for separate transmitting and receiving antennas.

Input pulses go from terminal 12 through attenuator 14 to input mixer 16. Local oscillator 18 is also connected to mixer 16. The frequency of oscillator 18 is so selected that the pulses from the radar set are converted to a convenient intermediate frequency. The $i$—$f$ pulses from the output of mixer 16 are delayed for a desired length of time, as will be explained more fully below, and then are heterodyned again against oscillator 18 in output mixer 20. Delayed pulses having the same shape and frequency as the pulses at the input of mixer 16 are thus obtained from the output of mixer 20.

A circulating amplifier 21 having a plurality of stages 22 and 24 has its output fed back to its input through a loop cable 23, which preferably consists of a suitable length of coaxial cable. The overall gain of the loop comprising stages 22 and 24 and cable 23 is adjusted to unity.

Pulses from mixer 16 are fed through shutter stage 17 to the input of loop stage 22. Shutter stage 17 is gated off during the interval between pulses received from mixer 16. Shutter stage 17 prevents any spurious signals reaching mixer 16, between desired pulses, from entering circulating amplifier 21.

It will be understood that each pulse reaching amplifier 21 from stage 17 will be recirculated a number of times through stage 22, loop cable 23, and stage 24. The recirculation time is small compared to the interval between radar pulses. Amplifier 21 is gated on just before each pulse from stage 17 and is kept on for a sufficient time to permit the received pulse to be circulated a number of times.

Circulating pulses are taken from the output of stage 22, or from any other convenient point on the loop, and are fed to the input end of a delay cable 26 that is terminated in a resistive load 27 equal to the characteristic impedance of cable 26. A series of taps along the length of cable 26 are connected through fixed attenuators 31—39 to contacts 41—49 of selector switch 50.

The taps on cable 26 are preferably so located as to provide a delay between taps that is a convenient fraction of the circulation time of the loop amplifier 21. For example, it may be convenient to make the circulation time correspond to an echo distance of 1000 feet, and to make the time delay between taps correspond to 100 feet. Fixed attenuators 41—49 are so selected that the signal amplitude at rotating contact 51 of switch 50 is the same regardless of the position to which contact 51 is turned.

Rotating contact 51 is connected to the input of a gated amplifier 60. Amplifier 60 is gated on for a time long enough to pass one, and only one, of the delayed circulating pulses received from contact 51. The gating circuit, which will be further described below, permits amplifier 60 to pass the 1st, 2nd, or $n$th recirculated pulse after it has been taken from amplifier 21 and delayed by a further amount determined by the position of rotating contact 51. The output of amplifier 60 is connected to output mixer 20.

To adjust the gain between the input of mixer 16 and the output of mixer 20 to unity, a pulsed signal from a calibration oscillator 61 is applied to the input of mixer 16. This input signal is detected by detector 62. Similarly, the signal at the output of mixer 20 is detected by detector 63. The outputs of detectors 62 and 63 are compared by means of comparator 64, which may conveniently be a cathode-ray oscilloscope. The gain may then readily be adjusted to unity by adjusting the gain of mixer 16, shutter stage 17, amplifier 60, or mixer 20.

The output of mixer 20 is connected through variable attenuator 66 to input-output terminal 12.

The necessary gating signals, which have been mentioned above, are obtained from timing system 70. The input signal at mixer 16 is applied to synchronizing pulse detector 71, the output of which is applied to the inputs of loopgating multivibrator 72 and variable delay multivibrator 73. Detector 71 produces a synchronizing pulse each time an input pulse is received at mixer 16. This synchronizing pulse from detector 71 triggers multivibrator 72, which gates loop amplifier stage 24 "on" long enough to permit the pulse from shutter stage 17 to recirculate the maximum desired number of times.

The positive gate from multivibrator 72 is also applied to delay network 74, which has a delay time slightly greater than the duration of a radar pulse. The output of network 74 drives an overdriven amplifier 76 the output of which gates shutter stage 17 "off." It will be understood that the negative gate from amplifier 76 has the same duration as the positive gate from multivibrator 72 but is delayed.

Variable delay multivibrator 73 gives a negative gate. The duration of this gate can be varied to correspond to any desired number of pulse trips around circulating loop amplifier 21. R–C peaker 77 is connected to the output of multivibrator 73. The trailing edge of the negative gate from multivibrator 73 causes R–C peaker 77 to trigger selection gate multivibrator 78. Multivibrator 78 in turn provides a positive gate of sufficient duration to permit the desired recirculated pulse, after delay in cable 26, to pass through gated amplifier 60.

From what has been said above it will be understood that an input pulse applied to input-output terminal 12 will cause an echo pulse of identical frequency and waveform to be subsequently returned to the same terminal. The delay time of the echo pulse can be varied over a wide range by suitable adjustment of switch 50, multivibrator 73, and multivibrator 78. The attenuation of the echo pulse will be the sum of the attenuations provided by attenuators 14 and 66 and can readily be adjusted to any desired value.

It will be apparent that the embodiments shown are only exemplary and that various modifications can be made in construction and arrangement within the scope of the invention as defined in the appended claim.

I claim:

An echo simulator adapted to be connected to the antenna terminal of a pulsed radar set and to return a simulated echo signal to said antenna terminal in response to a transmitter pulse from said antenna terminal, said simulator comprising: an input-output terminal; an input attenuator connected to said terminal; an input mixer connected to the output of said attenuator; a gated shutter stage connected to the output of said mixer, said shutter stage being gated off during the interval between received pulses; a circulating amplifier connected to the output of said shutter stage, the loop transit time of said circulating amplifier being less than half of the period of the pulses emitted by said radar set; first gating means for gating said circulating amplifier off after a pulse received from said shutter stage has been circulated a plurality of times and for thereafter gating said circulating amplifier on before the next pulse is received from said shutter stage; a delay cable connected to receive circulating pulses from said circulating amplifier; a plurality of taps on said delay cable; a gated amplifier; switch means for connecting the input of said gated amplifier to any one of said taps; second gating means for gating said gated amplifier on for a time sufficient to pass only one of said circulating pulses; an output mixer connected to the output of said gated amplifier; an oscillator supplying a local signal to both said input mixer and said output mixer; a pulsed calibration oscillator for supplying a calibrating signal to the input of said input mixer; an amplitude comparator for indicating amplitude equality of the signal at the input of said input mixer and the signal at the output of said output mixer; adjustable gain control means for adjusting to unity the gain between the input of said input mixer and the output of said output mixer; and attenuator means connecting the output of said output mixer to said input-output terminal.

References Cited in the file of this patent

UNITED STATES PATENTS

| | | |
|---|---|---|
| 2,421,016 | Deloraine | May 27, 1947 |
| 2,505,525 | Clapp et al. | Apr. 25, 1950 |